No. 688,266. Patented Dec. 3, 1901.
A. W. SANDELL.
DRIVING MECHANISM FOR SELF PROPELLED VEHICLES.
(Application filed Dec. 21, 1900.)
(No Model.) 3 Sheets—Sheet 1.
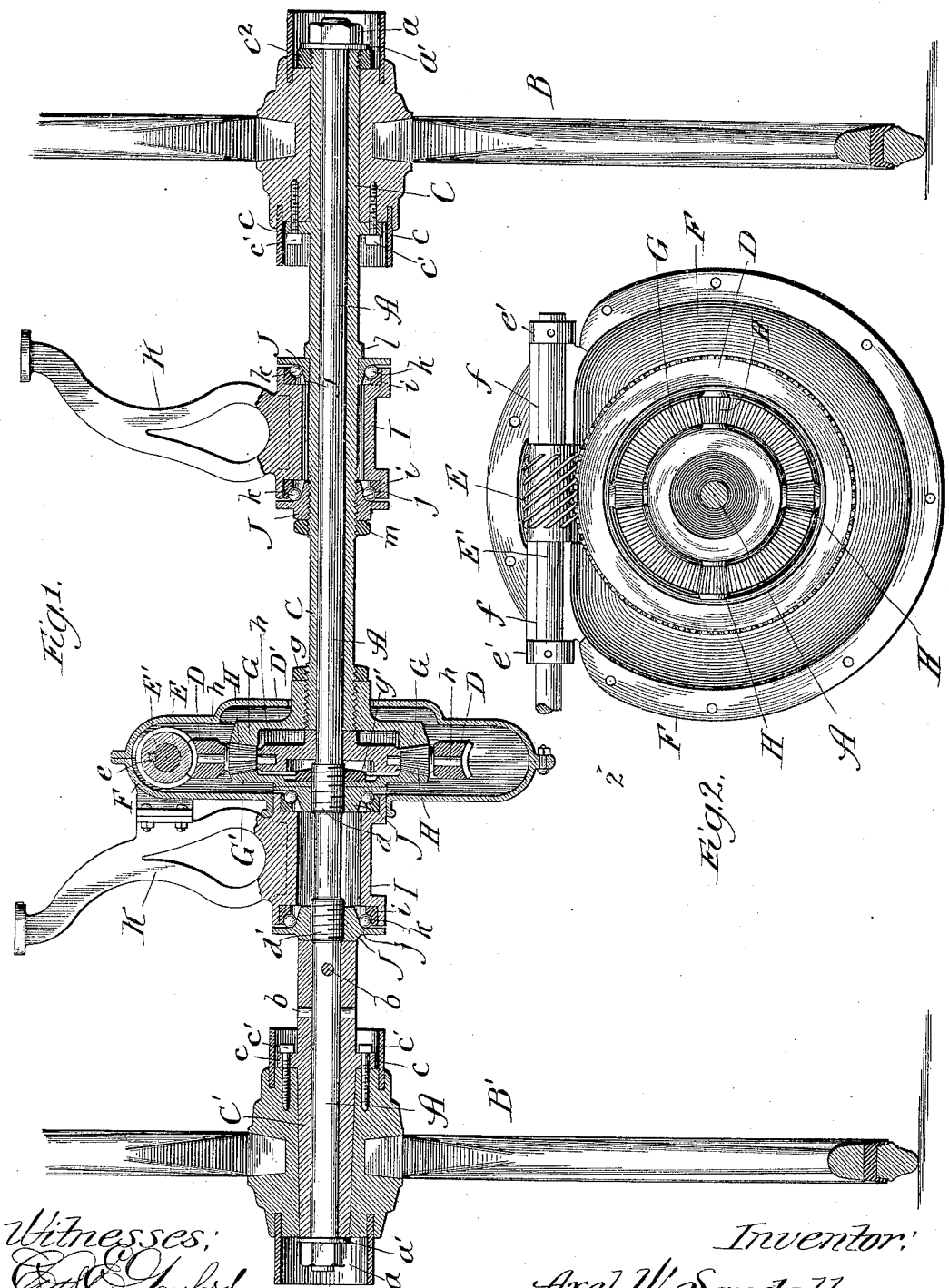
Witnesses:
Inventor:
Axel W. Sandell

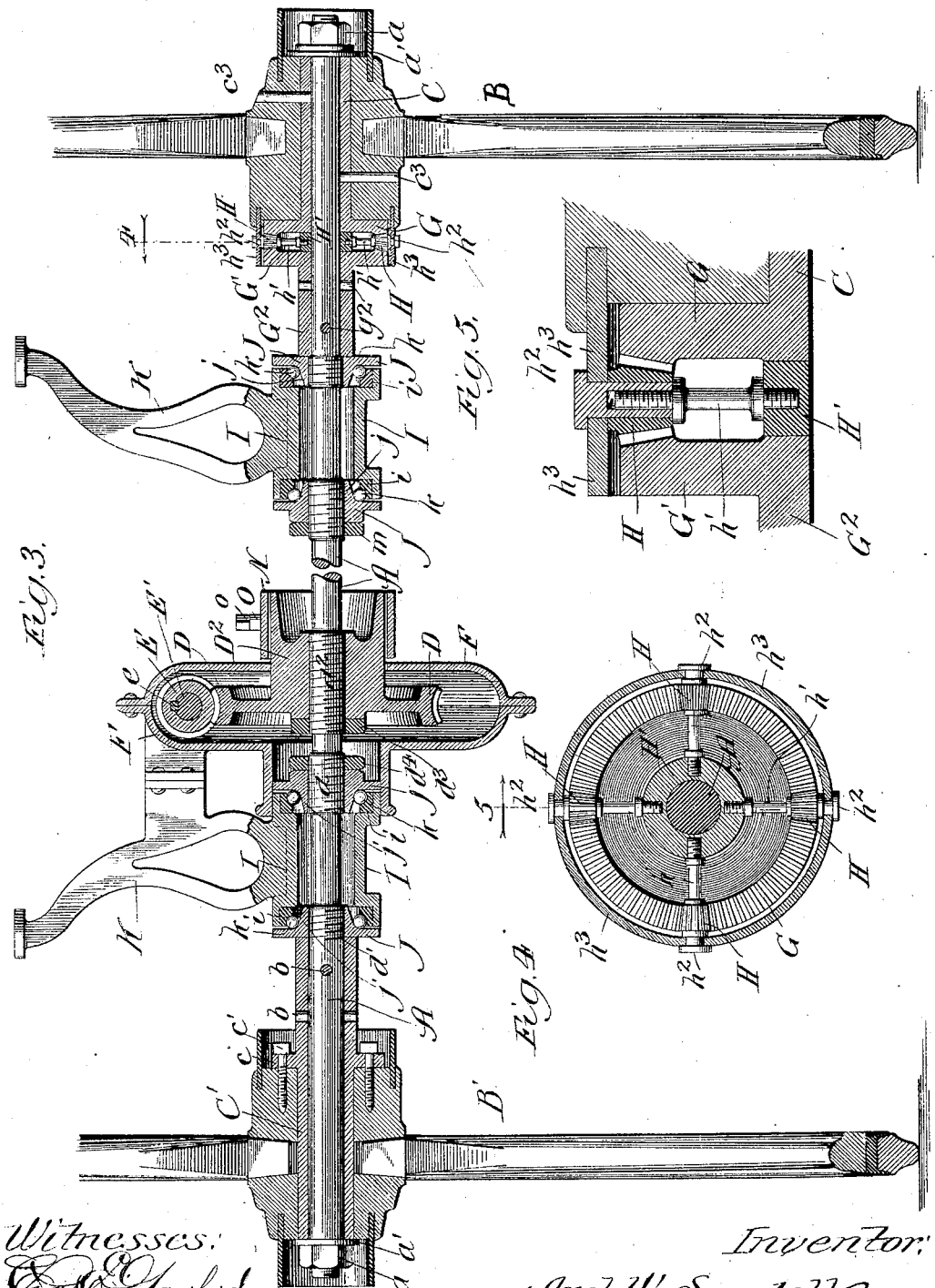

No. 688,266. Patented Dec. 3, 1901.
A. W. SANDELL.
DRIVING MECHANISM FOR SELF PROPELLED VEHICLES.
(Application filed Dec. 21, 1900.)
(No Model.) 3 Sheets—Sheet 3.
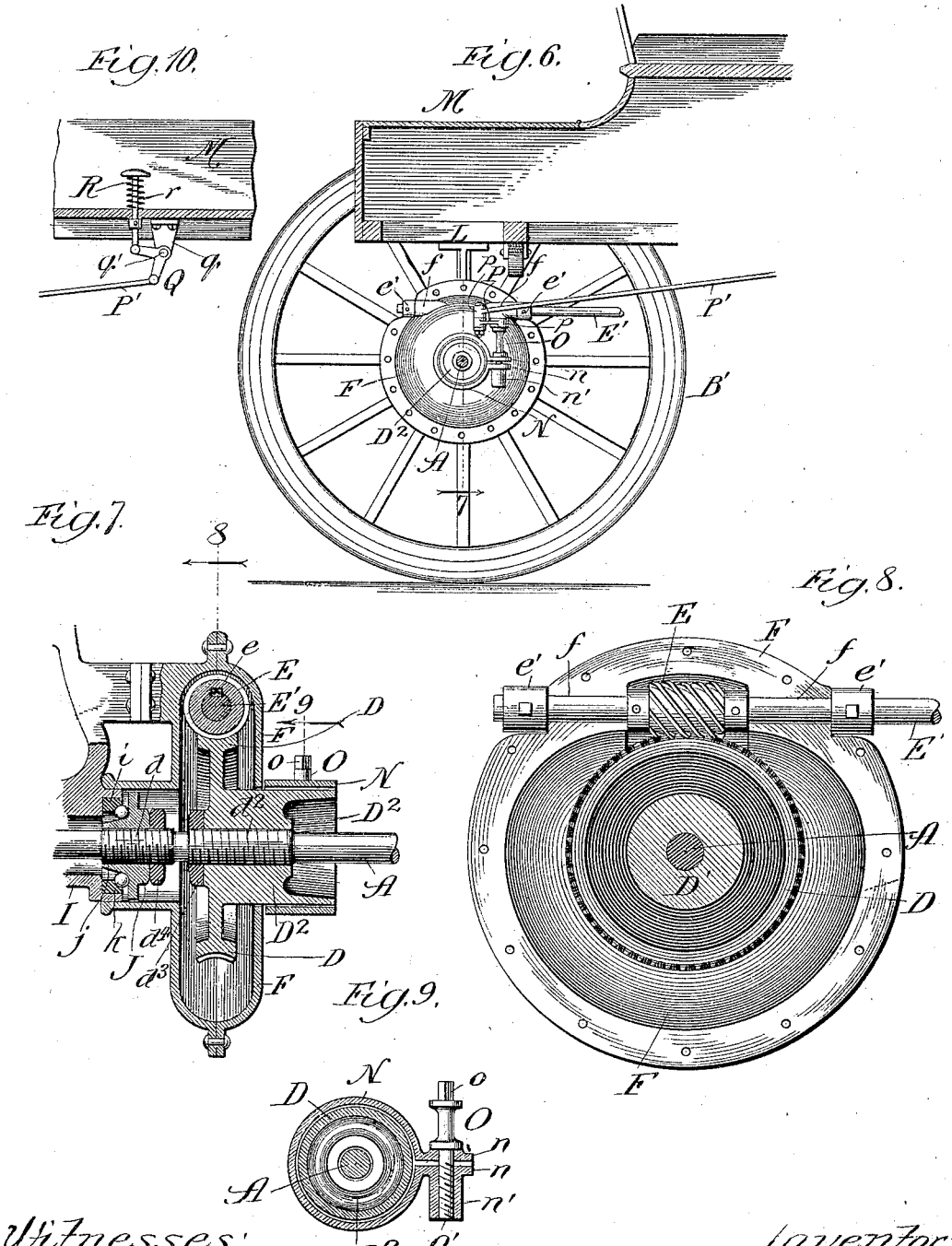

UNITED STATES PATENT OFFICE.

AXEL W. SANDELL, OF CHICAGO, ILLINOIS, ASSIGNOR OF ONE-HALF TO JACOB LAUTH, OF CHICAGO, ILLINOIS.

DRIVING MECHANISM FOR SELF-PROPELLED VEHICLES.

SPECIFICATION forming part of Letters Patent No. 688,266, dated December 3, 1901.

Application filed December 21, 1900. Serial No. 40,643. (No model.)

*To all whom it may concern:*

Be it known that I, AXEL W. SANDELL, a citizen of the United States, residing in Chicago, in the county of Cook and State of Illinois, have invented a certain new and useful Improvement in Driving Mechanism for Self-Propelled Vehicles, of which the following is a specification.

Self-propelled vehicles as now constructed are ordinarily driven from the rear axle through a properly constructed and arranged driving mechanism, and it is the practice to employ a compensating gear on the rear axle for use in turning corners and otherwise. The prior construction of rear axle is one made in two sections or halves, having a compensating gear as a connection between the sections or halves, and while this construction enables the vehicle to be driven and to operate in turning corners and otherwise it lacks the stability that should properly pertain to a rear axle for self-propelled vehicles.

The objects of the present invention are to construct a rear axle for use in self-propelled vehicles which will be a continuous shaft having the requisite strength and rigidity for propelling purposes and combining with such continuous shaft or axle a compensating means properly located and operating, to improve the construction and operation of the compensating gear, to improve the construction and operation of the main driver for revolving the axle and its location, arrangement, and operation in connection with the axle and the compensating gear, and to improve generally the construction of the rear axle and the parts coacting therewith for revolving the axle and allowing the compensation necessary for turning corners and otherwise in the running of the vehicle.

In the drawings it is deemed necessary to show only so much of a self-propelled vehicle as is required to illustrate the invention, and for this reason the rear axle is shown with a portion of the rear end of the body or box of the vehicle.

In the drawings, Figure 1 is a sectional elevation of the rear axles, showing the wheels broken off on one side; Fig. 2, a cross-section on line 2 of Fig. 1; Fig. 3, a similar view to Fig. 1, showing the compensating gear arranged adjacent to the hub of a wheel and the driving-gear located as in Fig. 1, but not combined with the compensating gear, as in Fig. 1; Fig. 4, a cross-sectional elevation of the compensating gear on line 4 of Fig. 3; Fig. 5, a detail in section showing the construction and arrangement of compensating gear of Fig. 3; Fig. 6, a sectional elevation showing the rear axle with the driving-gear thereon and one of the carrying-wheels and showing also the rear end of a vehicle body or box; Fig. 7, a sectional elevation of the driving-gear, taken on line 7 of Fig. 6 but enlarged as compared with Fig. 6; Fig. 8, a sectional elevation on line 8 of Fig. 7; Fig. 9, a detail, being a sectional elevation of the brake-band; and Fig. 10, a detail, partly in section, showing the foot-lever and rod for operating the brake-band.

The construction shown in Figs. 1 and 2 has the compensating gear and the driving mechanism combined in juxtarelation one to the other, while the construction shown in the remaining figures has the compensating gear and the driving mechanism arranged apart and not in juxtarelation one to the other; but in either form of construction and arrangement the driving-gear and the compensating gear have the necessary and proper coacting relation for each to perform its required office and work.

The rear axle is a continuous shaft A, having at one end a wheel B and at the opposite end a wheel B', and each end of the shaft-axle is screw-threaded to receive a nut $a$, by means of which and a washer $a'$ the hub of each wheel is secured on the end of the shaft-axle. The hub of the wheel B has a box C, and the hub of the wheel B' has a box C', and, as shown in Fig. 1, the end of the box C extends beyond the end of the hub and is screw-threaded to receive a nut $c^2$, by means of which the hub is held on the box between the nut and a flange or collar $c$, through which collar attached bolts $c'$ are entered into the hub, firmly connecting the hub and box with each other, and the hub of the wheel B' is connected to the box C' by means of a flange or collar $c$ and bolts $c'$, passing through the collar into the hub, and, as shown in Fig. 1, the box C' is attached to the shaft-axle by pins $b$, passing through the shaft-axle and the inner end of the box. The box C in the construction of Fig. 1 is loosely mounted on the shaft-axle and is free to revolve independent of the shaft-axle, while the box C' is attached to the shaft-axle and revolves therewith, so that the wheels are turned by the rotation of the shaft-axle and the axle-box.

The box C in the construction shown in Fig. 1 is prolonged or extended and incloses the shaft-axle to the limit of the length of the box, and its inner end is screw-threaded for a purpose hereinafter described. At the inner end of the extended box C is located a rim or ring having a peripheral concave face provided with leaves arranged diagonally thereon and forming a rim or ring gear D, and mounted loosely on the shaft in line with the gear D is a disk or hub D', having a connection with the gear, as hereinafter described. The rim or ring gear D has meshing therewith a spiral gear E, the flanges or ribs of which are separated a greater distance apart than usual and have a longer pitch, and the pitch of the leaves on the rim or ring gear have a corresponding inclination, by which arrangement either gear is free to revolve the other without any liability of one gear locking against the other, as is the case with an ordinary worm-gear, thus enabling the driving-gear, formed by the rim or ring gear and the spiral or worm gear, to be free for the rotation of either gear from the rotation of the other. The worm or spiral gear E is mounted on a shaft E' and keyed thereto by a suitable spline or key $e$, and the rim or ring gear and the spiral or worm gear are inclosed within a shell or casing F, made in two halves or sections, bolted or otherwise secured together around the gear, and the shaft E', which is to be driven from a suitable power, is mounted in boxes or bearings $f$, formed on the shell or casing, and, as shown, the shaft is held against end thrust and so as to maintain the gears in mesh one with the other by collars $e'$, attached to the shaft by set-screws or otherwise and abutting against the ends of the boxes or bearings $f$, as shown in Fig. 2.

The screw-threaded inner end of the box C has fixed thereon a bevel-gear G, locked on the sleeve by a jam or set nut $g$, and the shaft-axle has an enlargement $d$, provided with a screw-thread on which is fixed a bevel-gear G', forming a companion gear to the bevel-gear G and held on the shaft by a jam or set nut $g'$. The two companion gears G and G' are adjusted at a distance apart for the reception between them of pinions H, which are mounted on pins or journals $h$, forming the connection between the rim or ring gear and its disk or hub, as shown in Fig. 1. The construction employs four pinions H, arranged in pairs, with the pinions of a pair directly opposite each other, and the face of the pinions and of the companion bevel-gears which mesh with the pinions is but slightly tapered, so as to give an easy travel and reduce the liability of binding between the gears and pinions. The companion gears and the pinions constitute a compensating gear which permits of the necessary lost motion required for the turning of the axle in rounding corners or otherwise, so that the rear axle has a continuous shaft for driving and at the same time has the necessary provision of a compensating gear to enable the vehicle to turn corners without twisting or injuring the driving mechanism.

The axle has surrounding it a sleeve or tube I, into the ends of which project cones J and, as shown in the construction of Fig. 1, one of the cones J abuts against the hub or center of the bevel-gear G'. Each end of the sleeve or tube I has entered thereinto a race or track ring $i$, between which and the bearing-face $j$ of the cone is located ball-bearings $k$, giving the axle a free rotation in the sleeve or tube. A similar sleeve or tube I, having a cone J at each end and provided with a race or track ring $i$, between which and the bearing-face $j$ of the cone is located ball-bearings $k$, forms a support in which the extended box is free to revolve. The cone J at one end of the sleeve or tube abuts against a flange or enlargement $l$ on the axle-box, and the opposite cone is screw-threaded onto the axle-box and is held by a lock or jam nut $m$, so as to permit of the required adjustment of the cones, and the adjustment of the cones of the axle ball-bearing is attained by having one of the cones movable on a screw-threaded enlargement $d'$ of the axle, and, as shown, the inner extended end of the box C' abuts against the adjustable cone. Each sleeve or tube has fixed thereon or formed therewith a standard or upright K, on the upper end of which is mounted the frame or support L of the body or box M of the vehicle, as shown in Fig. 6. It will be seen that the body or box of the vehicle is supported on the rear axle by ball-bearing supports, one of which operates on the continuous shaft-axle and the other operates on the extended axle-box of one of the wheels, as shown in Fig. 1, by which arrangement the support of the vehicle box or body and the parts carried thereby on the rear axle is obtained, so as to leave the rear axle and the extended wheel-box perfectly free to be revolved from the driving-gear.

The driving-shaft E' is to be driven from a suitable power carried by the vehicle, and such shaft rotates the worm or spiral gear E, which revolves the rim or ring gear D, the revolution of which through the pinions and bevel-gears drives the continuous shaft-axle and the extended wheel-box in unison so long as the travel is in a straight line, or approximately so; but when a turning is to be made the compensating gear operates in the usual manner of such gears and permits the turning to be attained without straining or wrenching the driving mechanism.

The driving mechanism can be separated from the compensating gear without impairing the utility of either device, and an arrangement for this purpose is shown in Figs. 3, 4, 5, 7, and 8. The parts which enter into the construction illustrated in these figures are the same in every material respect, except the two mechanisms are separated and a corresponding change is made in the arrangement. The shaft-axle A is a continuous one; but the box C of the wheel B is only slightly projected beyond the end face of its hub and has formed therewith or secured thereto the bevel-gear G, and the box is attached to the hub by pins $c^3$, so as to drive the wheel from the rotation of the box. The companion gear G' is formed with or attached to a short sleeve $G^2$, secured to the axle by pins $g^2$, so as to rotate with the axle; and the connecting-pinions H are each mounted on a journal or pin $h'$, one end of which is screw-threaded into a ring H', loose on the shaft-axle, and the other end of which is screw-threaded and receives a sleeve $h^2$, passing through a band or rim $h^3$, extending out from the end of the hub, as shown in Figs. 3 and 5.

The gear D has a hub or center $D^2$, which is screw-threaded onto an enlargement $d^2$ of the shaft and is held thereon by a lock or jam nut $d^3$. This gear has a peripheral face, similar to the gear of Fig. 1 and is driven from a spiral or worm gear E, as in the case of Fig. 1, so as to drive or revolve the continuous shaft-axle A, which revolves the gear G', and through the connecting-pinions drives the companion gear G for the axle and sleeve to rotate in unison when the travel of the vehicle is in a straight line, and at the same time the companion gears, with the connecting-pinions, form a compensating gear for the turning of the axle in rounding corners or otherwise, the same as with the construction and operation of the driving-gear and the compensating gear described for the arrangement in Fig. 1.

The roller-bearing which coacts with the continuous shaft-axle in the construction of Fig. 3 has the cone J adjacent to the driving-gear screw-threaded onto an enlargement $d$ of the shaft-axle and held thereon by a jam or lock nut $d^4$, but otherwise is the same in construction as the roller-bearing for the axle in the construction of Fig. 1. The construction and operation of the compensating and the driving gears are the same in all material respects whether such gears are in juxtarelation, as in the arrangement of Fig. 1, or separated, as in the arrangement of Fig. 3, as in both cases the driving-gear performs its office and the compensating gear performs its office with the coacting relation between the two, as required for use. The construction of driving-gear illustrated in Fig. 3 permits of the employment of a brake-band N, encircling the hub $D^2$ of the gear. This brake-band is open on one side, as shown in Fig. 9, and at its open side is provided with lips or extensions $n$, the lower one of which is provided with a socket or tube $n'$, having a screw-threaded hole which encircles the screw-threaded stem $o'$ of a pin O, having a squared shank or end $o$, on which is slipped a socket at one end of a lever P, the other end of which is connected by a pin or pivot bolt $p$ with the rear end of a connecting-rod P', the forward end of which is attached to one arm of a bell-crank lever Q, pivoted to an ear or projection $q$ by a suitable pin or pivot $q'$, and having its other arm pivoted to a foot-lever or rod R, extending up through the bottom of the vehicle-body, so as to be pressed down on by the operator, and having a coil-spring $r$ for returning the parts after being pressed down. The downward movement of the lever or rod R turns the bell-crank lever and draws the connecting-rod P forward, giving the stem O a partial rotation, by which the screw-thread thereon operates and draws together the ears of the brake-band, compressing the band around the hub of the driving-wheel with sufficient friction to impede or stop the rotation of the wheel, as may be required.

What I claim as new, and desire to secure by Letters Patent, is—

1. In a self-propelled vehicle, the combination of a continuous shaft-axle, a wheel for each end of the shaft-axle, an axle-box for one of the wheels loosely mounted on the shaft-axle, an extension of the axle-box having at its inner end an exterior screw-thread, a bevel-gear screw-threaded onto the inner end of the axle-box extension and locked thereon, a bevel-gear fixed on the shaft-axle, the two gears facing and in juxtarelation one to the other, and a series of bevel-pinions, located between the two bevel-gears and loosely mounted on the shaft-axle, arranged in pairs with the pinions of a pair opposite each other, for connecting the shaft-axle with the axle-box through the gears, substantially as described.

2. In a self-propelled vehicle, the combination of a continuous shaft-axle, a wheel for each end of the shaft-axle, an axle-box for one of the wheels loosely mounted on the shaft-axle, an extension of the axle-box having at its inner end an exterior screw-thread, a bevel-gear screw-threaded onto the inner end of the axle-box extension and locked thereon, a bevel-gear fixed on the shaft-axle, the two gears facing and in juxtarelation one to the other, a series of bevel-pinions, located between the two bevel-gears and loosely mounted on the shaft-axle, arranged in pairs with the pinions of a pair opposite each other, and a driving mechanism fixed to the continuous shaft-axle and operating through the two bevel-gears and the series of pinions to drive the vehicle, substantially as described.

3. In a self-propelled vehicle, the combination of a continuous shaft-axle, a wheel for each end of the shaft-axle, an axle-box for one of the wheels loosely mounted on the shaft-axle, an extension of the axle-box having at its inner end an exterior screw-thread, a bevel-gear screw-threaded onto the inner end of the axle-box extension and locked thereon, a bevel-gear screw-threaded onto the shaft-axle and fixed thereon, the two gears facing and in juxtarelation one to the other, a lock-nut on the screw-thread of the axle-box extension engaging the hub of the gear, a lock-nut on the screw-thread of the axle engaging the hub of the axle-gear, a series of four bevel-pinions located between the two bevel-gears, and a driving mechanism fixed on the continuous shaft-axle and operating through the two bevel-gears and the four bevel-pinions to drive the vehicle, substantially as described.

4. In a self-propelled vehicle, the combination of a driving-axle, a driving-gear loosely mounted on the axle and having a concave peripheral face provided with diagonal cogs or ribs wide spaced apart and having a less pitch than forty-five degrees, and a driving-pinion having its circumferential face provided with diagonally-running flanges or ribs wide spaced apart and having a less pitch than forty-five degrees and intermeshing with the cogs or ribs of the driving-gear for enabling the driving-pinion to impart rotation to the gear and have the gear free to revolve independently with the driving-pinion stopped without stripping or injuring the pinion and gear, substantially as described.

5. In a self-propelled vehicle, the combination of a driving-axle, a driving-gear loosely mounted on the axle and having a concave peripheral face provided with diagonal cogs or ribs wide spaced apart and having a less pitch than forty-five degrees, a driving-pinion having its circumferential face provided with diagonally-running flanges or ribs wide spaced apart and having a less pitch than forty-five degrees and intermeshing with the cogs or ribs of the driving-gear for enabling the driving-pinion to impart rotation to the gear and have the gear free to revolve independently with the driving-pinion stopped without stripping or injuring the pinion and gear, a driving-shaft having the driving-pinion fixed thereon, a shell or casing inclosing the driving-gear and the driving-pinion and bearing on the shell or casing in which the driving-shaft is mounted, substantially as described.

6. In a self-propelled vehicle, the combination of a continuous shaft-axle, a wheel for each end of the shaft-axle, an axle-box for one of the wheels loosely mounted on the shaft-axle, a bevel-gear fixedly connected with the axle-box, a bevel-gear fixedly connected with the shaft-axle, connecting-pinions between the two bevel-gears loosely mounted on the shaft-axle, a driving-gear loosely mounted on the shaft-axle and having a concave peripheral face provided with diagonally-running cogs or ribs wide spaced apart and having a less pitch than forty-five degrees, and a driving-pinion having its circumferential face provided with diagonally-running flanges or ribs wide spaced apart and having a less pitch than forty-five degrees and intermeshing with the cogs or ribs of the driving-gear for rotating the continuous shaft-axle and axle-box and enabling the driving-pinion to impart rotation to the gear and have the gear free to revolve independently with the driving-pinion stopped without stripping or injuring the pinion and gear, substantially as described.

7. In a self-propelled vehicle, the combination of a continuous shaft-axle, a wheel for each end of the shaft-axle, an axle-box for one of the wheels loosely mounted on the shaft-axle, a bevel-gear fixedly connected with the axle-box, a bevel-gear fixedly connected with the shaft-axle, connecting-pinions between the two bevel-gears loosely mounted on the shaft-axle, a driving-gear loosely mounted on the shaft-axle and having a concave peripheral face provided with diagonally-running cogs or ribs wide spaced apart and having a less pitch than forty-five degrees, a driving-pinion having its circumferential face provided with diagonally-running flanges or ribs wide spaced apart and having a less pitch than forty-five degrees and intermeshing with the cogs or ribs of the driving-gear for rotating the continuous shaft-axle and axle-box and enabling the driving-pinion to impart rotation to the gear and have the gear free to revolve independently with the driving-pinion stopped without stripping or injuring the pinion and gear, a shell or casing inclosing the bevel gears and pinions and the driving-gear and driving-pinion, a driving-shaft having the driving-pinion fixed thereon, and bearings for the driving-shaft on the shell or casing, substantially as described.

8. In a self-propelled vehicle, the combination of a continuous shaft-axle, a wheel for each end of the shaft-axle, an axle-box for one of the wheels loosely mounted on the shaft-axle, an extension of the axle-box having at its inner end an exterior screw-thread, a bevel-gear screw-threaded onto the inner end of the axle-box extension and locked thereon, a bevel-gear screw-threaded onto the shaft-axle and locked thereon, the two gears facing and in juxtarelation one to the other, a series of bevel-pinions located between the two bevel-gears, a ring loosely mounted on the shaft-axle between the bevel-gears and having a series of radially-extending journals or pins, each journal or pin carrying a bevel-pinion, a driving-gear connected with the series of radially-extending journals or pins of the ring, and a driving-pinion intermeshing with the driving-gear, for operating the two bevel-gears and the bevel-pinions to drive the vehicle, substantially as described.

9. In a self-propelled vehicle, the combination of a continuous shaft-axle, a wheel for each end of the shaft-axle, an axle-box for one of the wheels loosely mounted on the shaft-axle, an extension of the axle-box having at its inner end an exterior screw-thread, a bevel-gear screw-threaded onto the inner end of the axle-box extension, a lock-nut on the screw-thread of the axle-box extension engaging the hub of the bevel-gear and locking the gear in place, a bevel-gear screw-threaded onto the shaft-axle, a lock-nut on the shaft-axle engaging the hub of the bevel-gear for holding the gear in place, the two gears facing and arranged in juxtarelation one to the other, a series of four bevel-pinions located between the two bevel-gears, a ring loosely mounted on the shaft-axle between the two bevel-gears, a series of four radially-extending journals or pins, each journal or pin carrying a bevel-pinion, a driving-gear connected with the series of radially-extending journals or pins and a driving-pinion intermeshing with the driving-gear, for operating the two bevel-gears and the four bevel-pinions to drive the vehicle, substantially as described.

AXEL W. SANDELL.

Witnesses:
EPHRAIM BANNING,
ADAM LAUTH.